UNITED STATES PATENT OFFICE.

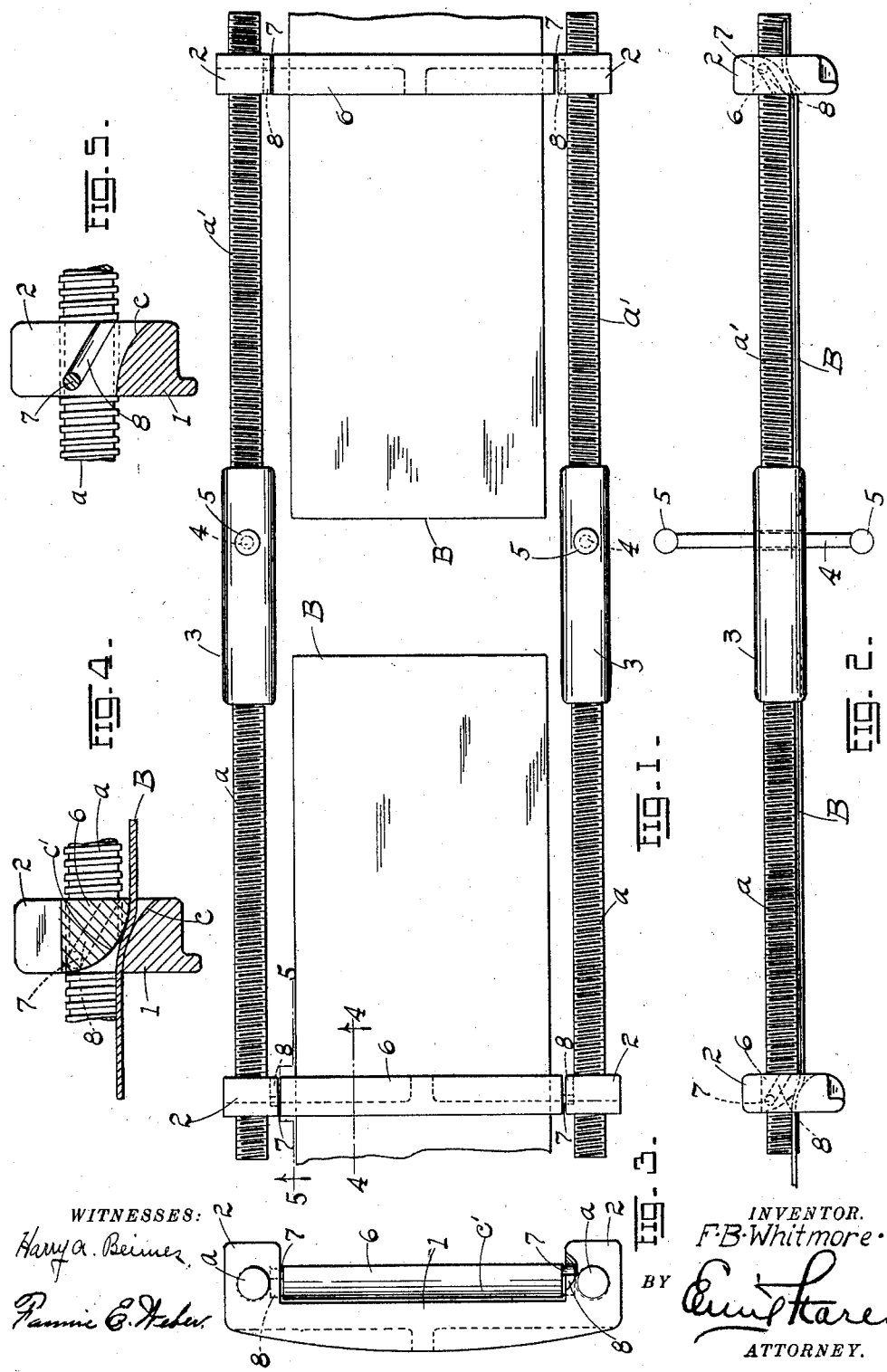

FREDERICK B. WHITMORE, OF ALTA, UTAH.

BELT-CLAMP.

964,827.

Specification of Letters Patent. Patented July 19, 1910.

Application filed November 5, 1909. Serial No. 526,454.

*To all whom it may concern:*

Be it known that I, FREDERICK B. WHITMORE, citizen of the United States, residing at Alta, in the county of Salt Lake and State of Utah, have invented certain new and useful Improvements in Belt-Clamps, of which the following is a full, clear, and exact description, reference being had to the accompanying drawings, forming a part hereof.

My invention has relation to improvements in belt-clamps; and it consists in the novel construction of clamp more fully set forth in the specification and pointed out in the claims.

In the drawings, Figure 1 is a top plan of my invention showing the same applied to a belt; Fig. 2 is a side elevation thereof; Fig. 3 is an end view of the same with belt omitted; Fig. 4 is a cross section through one of the clamp members on the line 4—4 of Fig. 1; and Fig. 5 is a cross-section on line 5—5 of Fig. 1, the section being taken just outside of the cam-bar.

The present invention has relation to that class of belt clamps by which the ends of a belt may be drawn together for purposes of tightening the belt preparatory to lacing or otherwise uniting said ends, without the necessity of removing the belt from the pulleys which support it.

The invention has for its object to provide a clamp and tightener which will entirely dispense with clamp-bolts and screws, cranks and gears; one which will exert an even draft on the belt ends making it impossible to pull the belt up crooked; one in which the gripping on the belt increases with the tension to which it is subjected; one which is simple, easy of manipulation, positive in its action, durable, containing a minimum number of parts, and one possessing further and other advantages better apparent from a detailed description of the invention, which is as follows:—

Referring to the drawings, B, B, represent the ends of the belt to be clamped and tightened. The clamp comprises a pair of terminal cross bars or members 1, 1, of a cross section designed to impart lightness and rigidity thereto, each member having up-turned terminals or arms 2, 2, provided with inner plane faces as shown. Through the arms are passed the ends of the right and left hand screw-sections $a$, $a'$, respectively, the centers of the screws having secured thereto the blocks or bosses 3, 3, through which are free to slide transversely the operating handles or levers 4, 4, the ends of the levers terminating in heads 5, 5, to prevent accidentally falling out. This form of lever is common in shop tools such as vises and the like, and is well known.

The upper surfaces $c$ of the cross-bars 1, 1, are curved, the curvature on the whole inclining upward toward the outer face of the bar (Figs. 4, 5) and above said curved surface is adapted to be pivotally mounted the cam-bar 6, said cam being substantially triangular in cross-section, having top and inner flat faces, and a bottom curved face $c'$ which engages the belt B on one side, the opposite or bottom side being engaged by the surface $c$ of the bar 1 on which the belt rests. The cam-bar is provided at the outer upper corners with pins 7, 7, projecting from the ends of the bar longitudinally thereof, these pins acting as trunnions about which the bar is free to rotate or rock, suitable upwardly and outwardly inclined ways or grooves 8, 8, being formed in the inner faces of the arms 2, 2, for the reception of the pins, the upper ends of the grooves being closed, and their lower ends open to initially receive the pins.

The cam bars when suspended from the pins (which they virtually are when the pins rest on the bottom walls of the grooves) tend to rock, gravitate or swing in the direction of the pins or outwardly, (that is, toward the belt), the center of gravity of the bar being to one side of and interior to, the axis of rotation of the bar, on which axis the pins are disposed. When therefore, the end of the belt is passed over the bar 1 and the cam-bar with its pins 7, 7, is slipped into the supporting grooves or ways 8, 8, and released, instantly the cam hugs the belt, swinging or rocking as it does toward it; and when extra tension is imparted to the belt, the tighter will be the grip thereon by the cam-bar. It will be seen that on account of the inner vertical face of the cam-bar being flat, it forms a corner at its intersection with the curved face $c'$, and this corner embedding itself as it does into the belt, prevents the belt from slipping. While the tension on the belt is increased, the cam-bar will ride up the inclines of the grooves or ways 8, 8, hugging and gripping the belt tighter and tighter as is obvious from the drawings (Fig. 4). This grip will be uniform for the entire width of the belt, and the draft will be even throughout, so that the belt can not be pulled up crooked. Of course, the necessary care must be exercised in creating an even draft on the ends of the supporting bars 1, 1, and this may be accomplished by the operator seizing the levers 4, 4, and giving them both an even swing or sweep so as to impart the same degree of rotation to the screws $a$, $a'$, by which the bars are drawn together. When the belt is tightened, the operator simply lifts the cam-bars off the belt, slips them out from the supporting grooves, and the clamp is thus free to drop away from the belt.

Having described my invention, what I claim is:—

1. A belt-clamp member comprising a cross-bar having an upper upwardly and outwardly curved face for the support of the belt, suitable inclined ways above the belt, a cam-bar pivotally mounted in said ways and normally gravitating about its pivotal axis toward the cross-bar, said cam-bar having a bottom curved face coöperating with the curved face of the cross-bar, whereby a belt interposed between the curved faces is gripped when subjected to tension.

2. A belt-clamp member comprising a cross-bar having an upper upwardly and outwardly curved face for the support of the belt, a cam-bar pivotally suspended above the cross-bar and normally gravitating toward the cross-bar, said cam-bar having a bottom curved face coöperating with the curved face of the cross-bar, whereby a belt interposed between the curved faces is gripped when subjected to tension.

3. A belt-clamp member comprising a cross-bar having an upper upwardly and outwardly curved face for the support of the belt, suitable inclined ways above the belt, a cam-bar pivotally mounted in said ways above the cross-bar and normally gravitating about its pivotal axis toward the cross-bar, the cam bar having a rear flat face and a bottom curved face whereby the intersecting edge between said faces tends to oscillate or drop toward the curved face of the cross-bar, and a belt interposed between the faces is gripped when subjected to tension.

4. A belt-clamp member comprising a cross-bar having an upper upwardly and outwardly curved belt-supporting face, upwardly projecting terminal arms, suitable upwardly and outwardly inclined ways formed on the inner faces of said arms, a cam-bar having an inner flat face and a curved bottom face, terminal supporting pins located near the upper ends of the curved face for engaging the inclined ways of the arms of the cross-bar, whereby the cam-bar when suspended in the ways, gravitates with its curved face toward the cross-bar, and thereby grips a belt interposed between the curved faces, when said belt is subjected to tension.

5. A belt-clamp member comprising a cross-bar having an upper upwardly and outwardly curved belt-supporting face, upwardly projecting terminal arms provided with upwardly and outwardly inclined grooves on their inner faces, said grooves having open bottom ends and closed top ends, a cam-bar having upper and inner flat faces, connected by a curved face, pivotal pins at the ends of the bar located at the upper outer corners of the bar, for rotatably supporting the cam-bar in the grooves aforesaid, a second similar belt-clamp member, and means for drawing the cross-bars of the members together whereby the ends of the belt inserted between the curved faces of the cross-bars and cam-bars of the respective members will be gripped and subjected to tension and drawn together.

6. A belt-clamp member comprising a cross-bar having an upper upwardly and outwardly curved face for the support of the belt, suitable ways above the belt, a cam-bar pivotally mounted in said ways and normally gravitating about its pivotal axis toward the cross-bar, said cam-bar having a bottom curved face coöperating with the curved face of the cross-bar, whereby a belt interposed between the faces is gripped when subjected to tension.

In testimony whereof I affix my signature, in presence of two witnesses.

FREDERICK B. WHITMORE.

Witnesses:
HENRY P. MINOR,
M. A. GERMO.